United States Patent [19]

Mullerheim et al.

[11] 4,191,647

[45] Mar. 4, 1980

[54] FILTRATION SYSTEM FOR HOUSEHOLD SEWAGE

[75] Inventors: Steven B. Mullerheim, Kensington; Fred G. Williams, Jr., San Anselmo, both of Calif.

[73] Assignee: Great Circle Associates, Walnut Creek, Calif.

[21] Appl. No.: 7,207

[22] Filed: Jan. 29, 1979

Related U.S. Application Data

[62] Division of Ser. No. 752,201, Dec. 20, 1976, Pat. No. 4,137,062.

[51] Int. Cl.$^2$ .............................................. B01D 35/00
[52] U.S. Cl. ........................................ 210/128; 210/170; 210/254; 210/259
[58] Field of Search ............... 71/8, 9, 10; 422/24; 210/10, 17, 18, 63 R, 63 Z, 64, 65, 66, 67, 77, 85, 97, 98, 100, 105, 104, 107, 116, 123, 125, 127, 128, 129, 137, 143, 152, 170, 196, 254, 257 R, 258, 259, 387, 401, 406, 416 R, 532 S

[56] References Cited

U.S. PATENT DOCUMENTS

| | | | |
|---|---|---|---|
| 2,736,434 | 2/1956 | Yacoe | 210/178 |
| 3,559,807 | 2/1971 | Reilly | 210/152 |
| 3,747,766 | 7/1973 | Brooks | 210/259 |
| 3,920,550 | 11/1975 | Farrell | 210/104 |
| 3,957,637 | 5/1976 | Morey | 210/137 |
| 4,042,497 | 8/1977 | Maltby | 210/104 |
| 4,123,358 | 10/1978 | Flagge | 210/104 |

*Primary Examiner*—Charles N. Hart
*Assistant Examiner*—Ernest G. Therkorn
*Attorney, Agent, or Firm*—Owen, Wickersham & Erickson

[57] ABSTRACT

A method and apparatus for treating wastewater such as sewage are disclosed. Designed principally for complete on-site wastewater treatment and disposal, the system separates wastewater into liquid wastes and solid wastes by filtration, treats the liquid wastes with a mild oxydizing agent and disperses them into unsaturated ground. The solid wastes are periodically removed, along with used portions of the paper filter medium and delivered, in the case of sewage, to a composting area where the still-fresh solids can be aerobically composted. Preferred and particularly advantageous embodiments of a filtering system, a sewage delivery system, a vacuum generating system, and a liquid level sensor, each of which may be used with the invention, are disclosed.

2 Claims, 14 Drawing Figures

FILTRATION SYSTEM FOR HOUSEHOLD SEWAGE

This is a division of application Ser. No. 752,201, filed Dec. 20, 1976, now U.S. Pat. No. 4,137,062.

BACKGROUND OF THE INVENTION

The invention relates to wastewater treatment, and more particularly to an efficient on-site wastewater treatment and disposal method and apparatus utilizing filtration.

Various systems have been used for treatment of residential and other wastes. In cities there have typically been central sewage treatment facilities for water-borne solid and liquid wastes conducted thereto from residences and other sources. Generally these systems have included separation of the solids from the liquids, sometimes by filtration. However, separation at this stage is only partially effective, since the solids and liquids have become nearly homogenized in transit. Such "separated" solids have often been subsequently subjected to a drying operation. See, for example, U.S. Pat. Nos. 2,736,434, and 3,559,807.

The liquids from such sewage treatment, which at this point carry many substances from the solids, have usually been chemically treated to the point that they can be returned to the soil or to flowing water. The solids have generally been either buried or composted. However, composting of sewage solids at this stage is nearly always anaerobic, since anaerobic decomposition has already begun as the wastes travelled through sewage lines to the treatment facility. Anaerobic composting is often not as desirable as aerobic compositing, primarily because of strong odors and the contamination of the surrounding air with disease-carrying organisms.

One type of on-site sewage filtration apparatus has been suggested in U.S. Pat. No. 3,747,766. That apparatus was intended to separate solid wastes from liquid wastes soon after their exit from households or other sources. However, the system of the patent was completely closed, with no provision for aerobic composting of solids. The final treatment of the solids was to be dehydration and/or burning. This type treatment is not only costly but also wasteful of the soil conditioning product that can be derived from aerobic composting.

The aforementioned U.S. Pat. No. 3,559,807 discloses a conveyor-type sewage filtering device which is in some respects similar to a filtering apparatus of the present invention. However, the filtering device of that patent does not include several particularly advantageous features of the present invention, and it is shown for use with solid material drying and burning apparatus.

There has been a need for an efficient, compact, and reliable wastewater separation and treatment apparatus in several areas of application in addition to sewage treatment. For example, in the food processing industry large quantities of water bearing organic materials must be separated from such materials at least to the point that the water can be safely returned to the soil. Similar problems exist with other industrial water-borne wastes. In industrial air pollution reduction equipment, solid pollutants are often ultimately carried by water. This water should be separated from the solids and purified before it is introduced to the soil or flowing water.

One aspect of the present invention concerns liquid level sensors for sensing the level or presence of liquid in a vessel or conduit. In the past, electronic level sensors responsive to variations in electrical capacitance introduced by proximity of a sensor and a liquid were known.

Such conventional capacitance responsive sensors utilized a variable capacitance element as a sensor or probe in combination with e.g. an alternating current bridge circuit. In such circuits essential components included a very stable reference oscillator, an adjustable bridge network, a rectified circuit, and a sensitive amplifier. Such circuits were characterized by complexity, high cost, lack of stability in rugged industrial environments, and generally unacceptable reliability.

SUMMARY OF THE INVENTION

The invention described herein is an on-site wastewater treatment and disposal system adaptable for many liquid separation applications, and particularly suited for sewage treatment for private dwellings or groups of dwellings. The basic principles of the invention are as follows:

(1) Solids are immediately separated from the wastewater input by a paper filter which is dispensed by a sequentially advanced continuous roll, formed into an input trough and exhausted of its filtrate by a suction applied from below.

(2) The trapped solids and paper filter are conveyed to a composting area where they are allowed to decompose by natural biological processes.

(3) The filtrate is oxidized, sand-filtered, and/or agitated to kill or remove most organisms and the disinfected filtrate is applied to unsaturated ground which removes all dissolved chemicals by natural biological processes, beneficially adding nitrogen to the soil. Sand filtration effects the required oxidation while also separating out any remaining suspended solids.

By the means disclosed, a number of unique and highly beneficial results are obtained over previous wastewater processing systems:

(1) Solids are removed soon after their entry into the wastewater flow while they still have a high degree of structural integrity and have not become "homogenized" with the liquids. This immediate filtration with a very efficient disposable filter allows for a highly filtered filtrate virtually free of suspended solids, low in bacteria, easily pumped, and readily disinfected.

(2) The almost total extraction of wastewater contaminats with the filter limits the need for process decontamination to a small fraction of the original wastewater volume. Thus, unlike conventional sewage treatment processes, no large tanks are needed for biological digestion of contaminants in solution.

(3) Composting of the paper with dewatered solids by either aeroabic or anaerobic means provides an energy-efficient, non-polluting and reliable method for decontaminating the solids for return to the ecosphere. Where aerobic means are used, sewage solids can be integrated with other organic solid wastes for optimized composting of both.

(4) The dissolved solids present in the disinfected filtrate, in the case of sewage, are primarily phosphates, alkyl benzyl sulfonates and organic nitrogen compounds, all of which are readily and productively absorbed by vegetation through the assistance of microorganisms. Nitrogen present in urine, which constitutes over 80% of the nitrogen in human waste, is preserved by this process in a liquid fertilizer; other aerobic and composting systems dissipate most of this nitrogen to the atmosphere as ammonia gas.

(5) The disinfected filtrate, being virtually free of suspended solids and containing slime-retarding oxidizing agents can be readily transported by narrow diameter pressurized pipe and dispersed to unsaturated ground through trickle irrigation, spray irrigation, or furrow irrigation with little danger of soil clogging or orifice clogging.

(6) This system, unlike many proposed on-site processing systems, can be installed into existing homes without changing any of the existing plumbing fixtures. Both sanitary and washing waste-waters are processed with no need for separate handling of the two. The system may also be easily installed at existing industrial sites for separating and treating non-sewage wastewaters bearing solids. In fact, it is highly adaptable to the food processing industry, where organic materials are carried in wastewater, and also to the reclamation of water from polluted-air cleansing "scrubbers" which pick up solids from the air they cleanse. For new homes, the installation of the on-site system can save considerably in piping costs.

An electronic liquid level sensor of the present invention includes an inductance-capacitance feedback oscillator operating preferably in the High Frequency spectrum and just beyond the threshold of oscillation. A sensor element, constituting one plate of a capacitor, is connected across the resonant circuit of the oscillator and is placed into close proximity with liquid at a level or position in a vessel or conduit of the processing system at which sensing of the presence of the liquid is desired. The liquid forms the other plate of the capacitor, and the presence of the liquid in proximity with the sensor element so reduces the quality or Q of the resonant circuit and increases the losses thereof that the oscillator ceases to oscillate.

The presence or absence of oscillations provide step functions for triggering a detector such as a bistable threshold device such as a Schmitt trigger. Output from the Schmitt trigger provides a logical control signal to the control section of the sewage processing system.

The oscillator may be implemented with very few components and possesses the operational advantage of failing safe; i.e., loss of oscillations indicates the presence of liquid or an equipment malfunction, events which deactivate further supply of liquid, etc.

Accordingly, some of the objects of the invention are as follows:

(1) To provide means for conveying, forming and exhausting filtrate from a paper filter;

(2) To provide a hydraulic/pneumatic subsystem consisting of one pump, several reservoirs, and several inexpensive valves to supply storage of incoming wastewater, pneumatic lift of wastewater to the paper filter, suction to the filtrate side of the filter, and hydraulic pressure for the treated liquid;

(3) To provide an interlock system between the treatment unit and the dwelling's water supply line, in the case of the application of the unit to household sewage treatment, to minimize the possibility of unit overload and sewage backups;

(4) To provide means for obtaining default operation as a septic process in the event of protracted power outages or other failures; and (5) To provide a reliable, inexpensive, and contamination-free type of electronic liquid level switch for use in conjunction with a control system serving the processing unit.

These and other objects, advantages, and features of the invention will be apparent from the following description of a preferred embodiment, taken in conjunction with the drawings.

DESCRIPTION OF A PREFERRED EMBODIMENT

1. General Operation and Filter System

Figure 1:
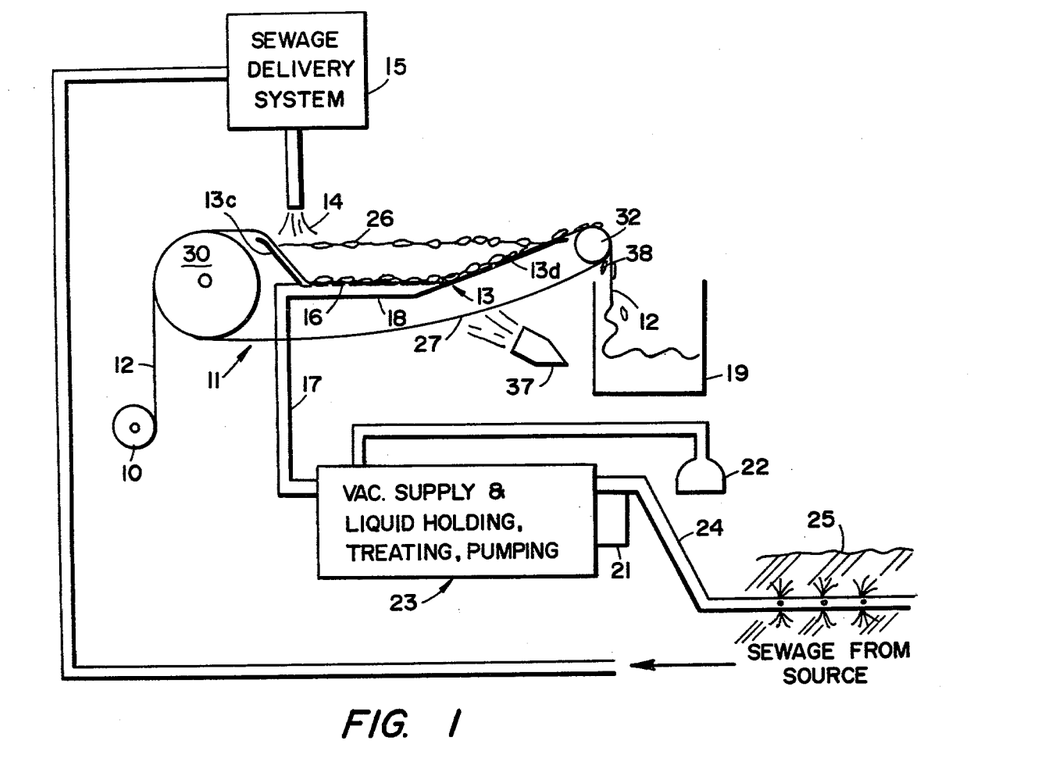
FIG. 1 is a schematic elevational view indicating the major components of the apparatus of the invention.

The basic components of the invention are shown in the schematic diagram of FIG. 1. Shown is a paper roll dispenser 10, which, by means of a porous, perforated, or otherwise foraminous belt conveyor 11, feeds filter paper 12 to a trough 13 which accepts input wastewater 14 from a wastewater delivery system schematically indicated at 15. The filtering trough 13 discharges output filtrate through a perforated bottom 16 and a suction tube 17 connected to a catch basin 18 below the perforated bottom.

The paper with trapped solids intermittently advances when the filter paper 12 becomes clogged, parting from and being dumped into a composting area 19 where the solids and paper 12 are allowed to decompose by natural biological processes. Filtered output wastewater is delivered by a pump 21, after treatment by a disinfecting means 22 (which may be a chemical oxidizing agent and/or a sand filter downstream of the trough), from a reservoir system 23 through a conduit 24 to unsaturated ground 25. Floating and settled solids 26 are also shown in FIG. 1 in the trough 13, as part of the fresh wastewater 14 which may comprise domestic sewage.

Figure 2:
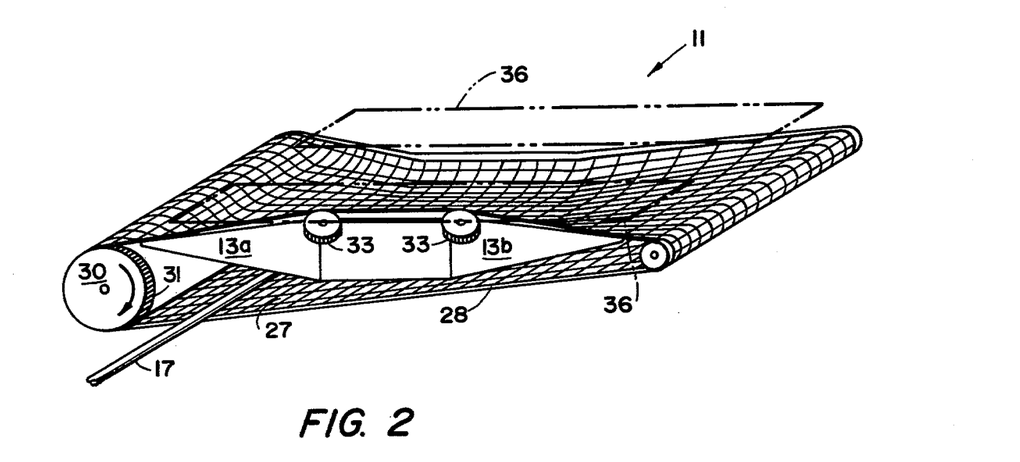
FIG. 2 is a perspective view showing a filtering trough and a filter paper conveyor which form part of the apparatus.

FIG. 2 shows in somewhat schematic perspective view the fundamental components of the conveyor 11. It includes a supporting net 27 bonded to edge-mounted gear belts 28, a motor-driven power drum 30 with geared edges 31 for power transfer, a front roller 32, edge guiding and supporting gear rollers 33, and the trough 13 to which the suction and filtrate conduit 17 is connected. The conveyor net or belt 27 may be formed of ⅜ inch square multi-strand nylon cord netting of about 1/16 inch thickness. Plate-like guides 26 (shown in phantom) restrict the upward and outward movement of the filter paper 12 (not shown in FIG. 2) as it advances along with the conveyor net 27 prior to receiving a charge of fresh wastewater. The conveyor net separates the filter paper from the trough at discrete points, which prevents clinging and lifts the paper from the trough when tractive power is applied for paper advancement.

As FIG. 2 indicates, the gear rollers 33 hold the edges of the conveyor net 27 inwardly at the central area of the trough, with the edge gear belts 28 positioned in almost vertical planes in this area. This helps guide and shape the upper reach of the belt or net 27 to the interior of the trough 13 by creating a central depression in the net. The weight of a charge of wastewater on a section of filter paper over the net conforms the net and paper fully to the trough. The trough 13 is narrowest in this central area, with its upstream and downstream ends 13a and 13b fanning outwardly to the full width of the conveyor net.

Figure 3:
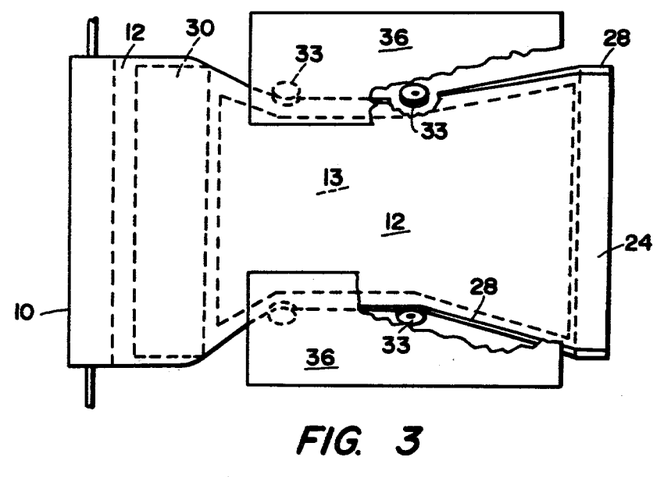
FIG. 3 is a plan view of the filtering trough and conveyor, along with other paper handling components.

As shown in FIG. 3—a plan view of the conveyor 11, the paper feed roll 10, the guides 36, and the filter paper 12—the paper is slightly (preferably several inches) wider than the width of the outstretched conveyor net 27. When paper is first loaded dry into the conveyor, it will have a tendency, being stiff, to ride flat over the gear belt edges 28, advancing with them by edge friction. Wastewater subsequently poured from above into the trough will cause the paper to collapse into the net, assuming the contour of the trough but clinging to the intervening net. The guides 36 prevent the edges of the paper from flopping inward upon collapse of the paper. The slightly overlapping width of the paper allows for proper action of the guides and assures that the paper completely fills the trough. As the conveyor is advanced, the mechanical stability of the arrangement will cause the paper automatically to center itself.

The paper roll dispenser 10 is shown in FIG. 1 below the power conveyor drum 30. This preferred position results in plenty of traction of the paper 12 over the power drum, and capillarity of liquids through the paper has been found not to be a problem. The liquids do not travel down to the roll 10. However, if desirable in a particular application, for a particular power drum diameter, conveyor net material, or paper type, etc., a pinch roller (not shown) may be included to press the paper against the power drum and increase traction. Also, the paper roll 10 may be positioned higher than the power drum (not shown) to reduce capillarity through the paper, if necessary.

The trough's upstream and downstream end walls 13c and 13d, as shown particularly in FIG. 1, are at oblique angles to provide for net and paper advancement and conformity to the trough. The slope of the downstream (paper exit) end wall 13d is more gradual than that of the entry wall 13c, as will be discussed further below.

Also shown in FIG. 1 is an ozone-producing ultraviolet lamp 37, which irradiates the returning portion 27 of the net, and a paper scraper 38, mounted to any fixed structure such as the trough 13, for disengaging the wet filter paper 12 from the net at the front roller 32. The lamp 37 not only irradiates the belt 27 but also produces a pervasive ozone atmosphere within the filtering unit enclosure (not shown) which will destroy odors and organisms adhering to fixed surfaces.

The conveying of the paper from the roll supply to its ultimate destination, the composting area, requires the careful handling and guidance afforded by the trough and conveyor structure illustrated, for the following reasons:

(1) Paper once wet loses all structural rigidity and has poor tensile strength.

(2) Wet paper clings tenaciously to the surfaces it contacts.

(3) The raw sewage on the inner surface of the paper filter should touch no other materials than the paper, since such contact will result in contamination and bacteria breeding.

(4) The paper must be so formed and supported as to create firm embankments on all sides of the contained sewage.

Ordinary filter paper when new exhibits a high flow-through rate for pure water. However, when filtering water which is contaminated with oils, scums or fine suspended solids, the paper loses its porousness and becomes clogged. The construction of the paper filter trough maximimizes the volume/surface area ratio, the filtering rate and the solids capacity of the filter before clogging occurs, and yet assures that solids can be reliably conveyed from the trough to the composting area.

These considerations necessitate the following design features for the trough:

(1) The use of a suction to evacuate the trough, as mentioned above. This can greatly increase the filtering rate by establishing a filter pressure over 50 times that obtained with gravity.

(2) The rigid perforated flat horizontal surface 16 on the bottom of the trough over which the suction can be distributed, thereby maximizing the paper area receiving suction, and assuring that suction loss is minimal until all liquid is evacuated.

(3) The gradually sloping surface of the end wall 13d over which the paper exits from the trough and into the composting area. This surface serves to capture floating oils and solids and to keep them away from the suction area. The slope of this surface must be as steep as possible for maximizing the volume/paper ratio of the trough and yet be gradual enough to assure that conveyed solids will not tumble back into the center of the trough. As can be envisioned from FIGS. 1 and 3, floating solids are drawn off to the right by surface tension skimming as the paper advances or the liquid recedes, while settled solids occupy the bottom and gradually inclined surfaces of the through.

(4) The sharply sloping surface of the end wall 13c over which the paper enters the trough from the paper roll. This slope must be steep enough to maximize the volume/paper area ratio of the trough and yet be gradual enough to assure smooth reliable movement of the conveyor and paper.

(5) Sidewalls on the side surfaces of the trough, including the outwardly bending portions 13a and 13b, to contain the input liquid.

2. Overall Water Cycle

Figure 4:
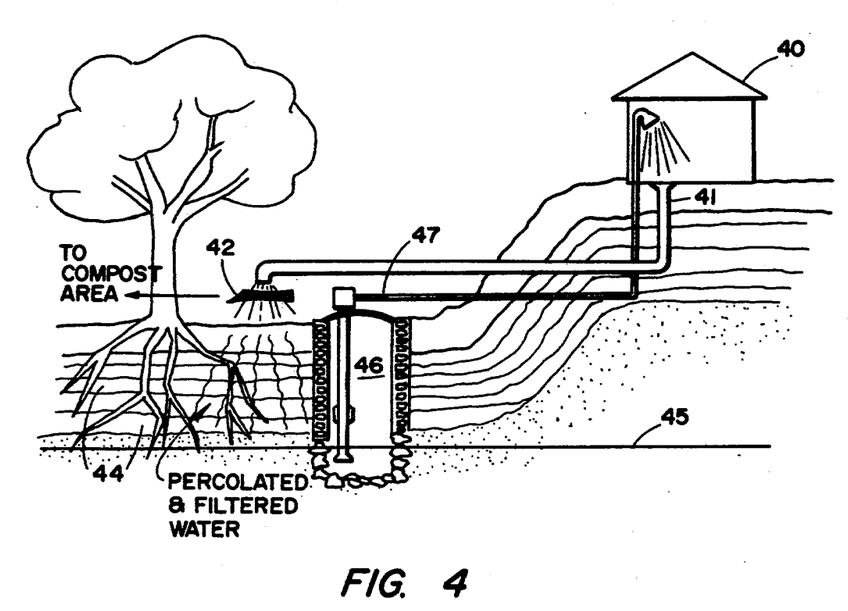
FIG. 4 is an elevational representation illustrating recycling of household sewage water according to the invention.

FIG. 4 illustrates a principle of the invention by which used household water is returned to the soil and ultimately back to the household as purified water. Water which has been used in a dwelling 40 passes through a sewer line 41, along with liquid and solid wastes, to filtering apparatus 42 of the invention. There the solids are removed from the liquids and transported to a composting area. The water and liquid wastes, after being treated with a mild oxidizing agent, are dispersed into unsaturated ground 43, where they slowly percolate down through subsoil and aquifers 44. Thus, when these liquids reach the water table 45, they have been purified by natural filtration and biologic processes of the ground, and may be again consumed by inhabitants of the dwelling 40. Along with other ground water, the purified water enters a well 46 and is recycled into the dwelling through a fresh water pipe 47.

This is an example of water purification and recycling at or near the use site. Of course the re-use need not be at the same site; recycling actually occurs, in a sense, whenever water and liquid wastes are returned to the soil.

3. Hydraulic/Pneumatic System

It is mandatory that input wastewater be stored temporarily in a reservoir before being fed to the filter trough, both to prevent overloading of the filter's capacity on a surge basis, and also to provide high capacity storage in case of a power outage or other failure. This reservoir will need to be located below the wastewater source level in order that it can be fed by gravity flow from a gravity wastewater pipe or network.

Wastewater must be transferred by some means from the reservoir to the filter, preferably in metered quantities, and this is done by the wastewater delivery system 15 schematically indicated in FIG. 1. The transfer should occur with minimal agitation since such agitation would disperse the solids in the wastewater and make filtration more laborious for the paper filter, particularly in the case of domestic sewage. The use of a liquid pump for such transfer is therefore undesirable. Other methods of effecting such transfer are gravity feed and pneumatic pressure. If gravity feed is used, the trough will have to be physically located below the reservoir, necessitating a very deep unit and rendering the trough very inaccessible.

Gravity feed also necessitatees the use of a rugged, power-actuated valve of at least 3" aperture to meter the wastewater, which may contain large solids, to the paper trough below. Such a valve is costly, and is unnecessary if pneumatic feed is used.

One of the features of the invention is a novel, inexpensive, and failure-resistant hydraulic/pneumatic system for providing, using only one centrifugal liquid pump and several inexpensive valves, pneumatic lift of the wastewater to the trough, suction of filtrate through the paper filter, and hydraulic pressure to the processed liquid. The subsystem of the invention uses a batch process which is readily controlled by a simple digital electronic control system triggered by level switches and timing circuits, and involves a minimal number of moving parts. The hydraulic/pneumatic system is illustrated in the schematic diagram of FIG. 5. Shown are an input wastewater pipe 50 from a source of fresh sewage, an input surge reservoir 51, a trap 52 connecting the input pipe to the reservoir, an input liquid level sensing switch 53, and a vertical riser pipe 54, leading to a buffer reservoir 55. A flap valve 56 at the lower end of the reservoir 55 is held closed by a counterweight 57. The buffer reservoir 55 also includes a buffer liquid level switch 58, and is connected at or near its top to a buffer suction line 59 connected to a buffer vent valve 60, which may be positioned as shown or at any location near the top of the reservoir 55. Also shown are the filtering trough 13, the trough drain pipe 17, the perforated suction plate 16, and a return reservoir 62 and power reservoir 63 of the reservoir system 23 (see also FIG. 1). The reservoirs 62 and 63 include a return release valve 64, a solenoid 65 for actuating the valve 64, a centrifugal pump 66 for pumping liquid from the power or lower reservoir 63 through a conduit 67 to the return or upper reservoir 62, a check valve 69 and a disinfectant inlet 70 (from the disinfecting means 22) in the conduit 67, and a liquid level sensing switch 68. As indicated, the buffer suction line 59 and the trough suction/drain line 17 are connected through valves 71 and 72, respectively, to the upper part of the lower reservoir 63, near its top. A liquid level sensing switch 74 is positioned in the trough 13, slightly above the perforated bottom 16. The liquid output conduit 24, which leads to the output effluent distribution shown in FIG. 1, extends from the upper part of the upper reservoir 62. Omitted from FIG. 5 for clarity are the paper filter feed and conveyor subassembly and the composting apparatus.

Figure 5:
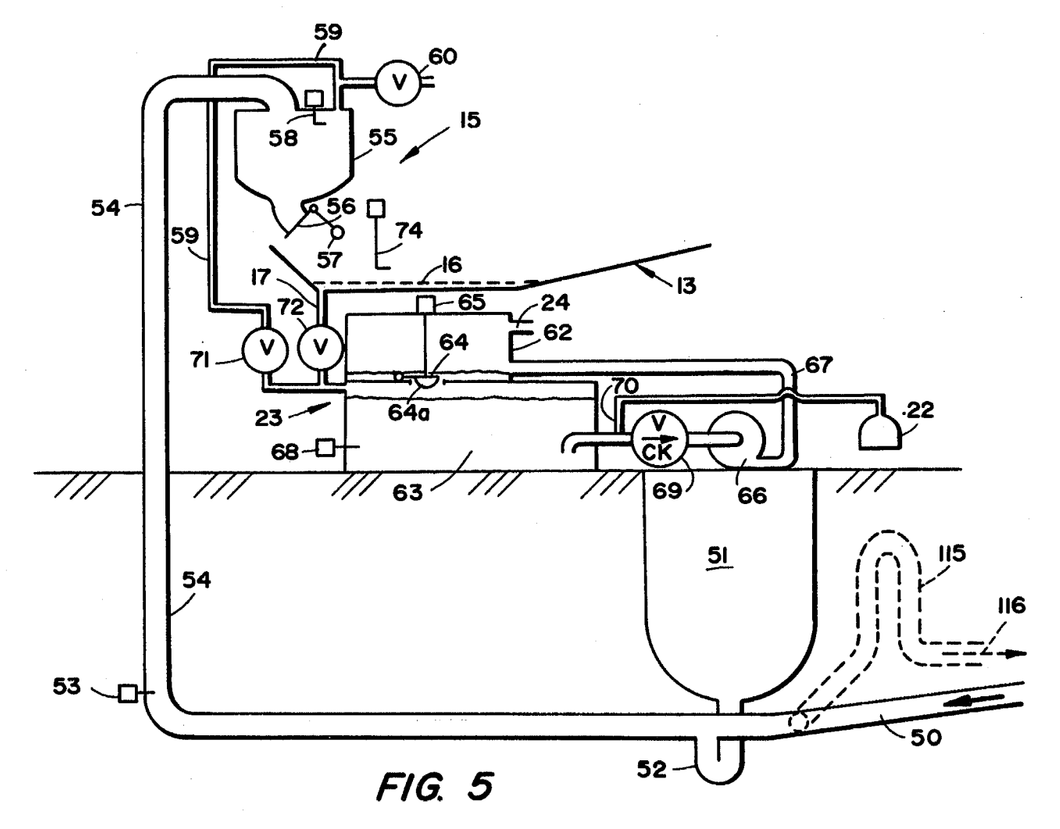
FIG. 5 is a schematic elevational view showing a hydraulic/pneumatic wastewater handling and suction generating system of the invention.

In the quiescent state, the power or lower reservoir 63 is filled with filtered liquid wastewater and disinfectant in solution as shown. The solenoid operated valves 71, 72, and 60 are normally open and the flap valve 56 is held closed by the counterweight 57. The valve 64, a flap valve with an attached float 64a similar to that used as a flush valve in toilet tanks, is held closed by its own weight reinforced by a small head of filtered liquid remaining in the return reservoir 62, as shown.

The processing cycle is started when incoming wastewater flows down the input pipe 50 and is of sufficient quantity to actuate the liquid level switch 53. The trough suction valve 72 and the buffer vent valve 60 are then closed and the centrifugal pump 66 is started, causing liquid to be pumped out of the power reservoir 63 and into the return reservoir 62. Exhaustion of liquid from the power reservoir 63 creates a vacuum in the upper portion of this reservoir, thereby causing a suction to be conveyed from the reservoir through the opened valve 71, through the buffer suction line 59 to the buffer reservoir 55. This suction in turn causes incoming wastewater to be lifted up the riser pipe 54 into the buffer reservoir 55.

When sufficient wastewater has filled the buffer reservoir 55 to actuate the liquid level switch 58, the valve 71 is closed, thereby sealing off the power reservoir 63, and the buffer vent valve 60 is opened, thereby releasing the suction in the suction line 59. The counterweight 57 is so adjusted that the wastewater filling the buffer reservoir 55 is of sufficient head to overcome its weight when suction is removed, and the flap valve 56 therefore opens, dumping substantially all of the contents of the buffer reservoir 55 into the paper filter (not shown) positioned in the filter trough 13.

Continued pumping by the pump 66 causes an increase in vacuum stored in the power reservoir 63. Meanwhile, excess liquid pumped into the return reservoir 62 is pumped out the outlet conduit 24 to be dispersed into the soil. When the liquid level in the power reservoir 63 has been reduced to the threshold of the liquid level sensor 68, the pump 66 is turned off and the solenoid operated valve 72 is opened. The accumulated vacuum of the reservoir 63 then causes a suction to be applied to the trough 13 through the opened valve 72 and the trough drain pipe 17. Wastewater thus commences to be filtered under suction through the paper in the trough 17, with the filtrate flowing into the power reservoir 63. The return reservoir 62 is at this point full to the level of the outlet 24.

When the liquid in the trough 17 has receded to below the threshold of the liquid level switch 74, the switch is actuated. At this point, the power reservoir 63 has been partially refilled by filtrate. After a small delay to allow for complete exhaustion of liquid from the trough (the sensing switch 74 is slightly above the trough bottom 16), the valve 71 is opened, thereby venting the power reservoir 63 to the atmosphere through the opened valve 60 and the suction line 59. The return reservoir release valve 64 is then momentarily actuated by the solenoid 65. The valve 64 opens and stays open by float action until most of the liquid in the return reservoir 62 has drained back into the power reservoir 63, whereupon the reservoir 63 becomes nearly filled again. The processing cycle ends when the return reservoir 62 is nearly empty, as illustrated in FIG. 5.

Disinfectant such as chlorine is applied at the inlet 70, which is a venturi device, at the input side of the pump 66. A small amount of disinfectant is metered into the conduit 67 in response to the flow of liquid. Agitation caused by the pump, as well as feedback in the hydraulic flow through the valve 64 assures a high degree of contacting between the disinfectant and filtrate wastewater. As an alternative or additional treatment, the filtrate may be conducted through a sand filter (not shown) between the trough and the pump 66.

Disinfected, filtered wastewater is discharged from the outlet 24 under pressure during the final portion of the pumping cycle, once the return reservoir 62 has filled to the level of the outlet 24. The quantity of liquid pumped out will be approximately that dumped into the trough 13 by the buffer reservoir 55.

During each process cycle, the pump 66 pumps more liquid than is discharged from the outlet 24, with the difference being that quantity of liquid temporarily stored in and later returned by the return reservoir 62 to the power reservoir 63. The function of this added increment of pumping is to provide a reserve of suction (1) to lift wastewater into the buffer reservoir 55 through the riser pipe 54; (2) to provide filtering suction for the trough; and (3) to make up for any liquid or pneumatic losses that may occur during the cycle. Theoretically, the added increment of pumping and the upper reservoir 62 itself could be eliminated entirely if the wastewater riser pipe 54 were short enough, the volume of liquids in the wastewater were consistent enough, and there were no pneumatic losses. However, to provide sufficient versatility in the wastewater treating apparatus, the inclusion of the upper or return reservoir 62 and the added pumping is preferred.

Even with the presence of the upper reservoir 62, the added increment of pumping can be minimized by keeping the length of the riser pipe 54 to a minimum and by maximizing the volume of the buffer reservoir 55 with respect to that of the riser pipe 54. Of course the length of the riser pipe 54 is also absolutely limited by the height limit to which the generated suction can pull wastewater. The input reservoir 51 serves two functions: (1) to temporarily store surges of wastewater input until such time as they can be processed; and (2) to act as a holding tank in the event of a unit failure or power outage. The trap connection 52 between the reservoir 51 and the wastewater input pipe 50 has the effect of discouraging both settled solids and floating solids from entering the reservoir. Such solids as may settle in the bottom of the trap 52 will tend to be flushed out by the backflushing action of wastewater dropping down the riser pipe 54 during a portion of the process cycle.

The pump and each of the valves 71, 72, 64, 69, and 60 transfer either air or highly filtered liquid. This assures a long life for these components, and allows the use of inexpensive solenoid operated valves of relatively small aperture.

As a substitute for or supplement to oxidation as the means for disinfection, ultrasonic agitation can be employed. Such ultrasonic radiation, the use of which is known for treating wastewater, can be supplied by means of a transducer (not shown) located in the power reservoir 63.

By its operation as both a vacuum pump and a filtrate discharge pump, the pump 66, in conjunction with the described arrangement of valves, suction lines and reservoirs, serves functions which would normally require two or three pumps. The system illustrated in FIG. 5 utilizes gravity and a single pump in a highly unique and efficient way, while still eliminating wastewater valving problems, and forms a very important part of the invention. The logic of the system's operation is described below.

4. Digital Control System

Figure 6:
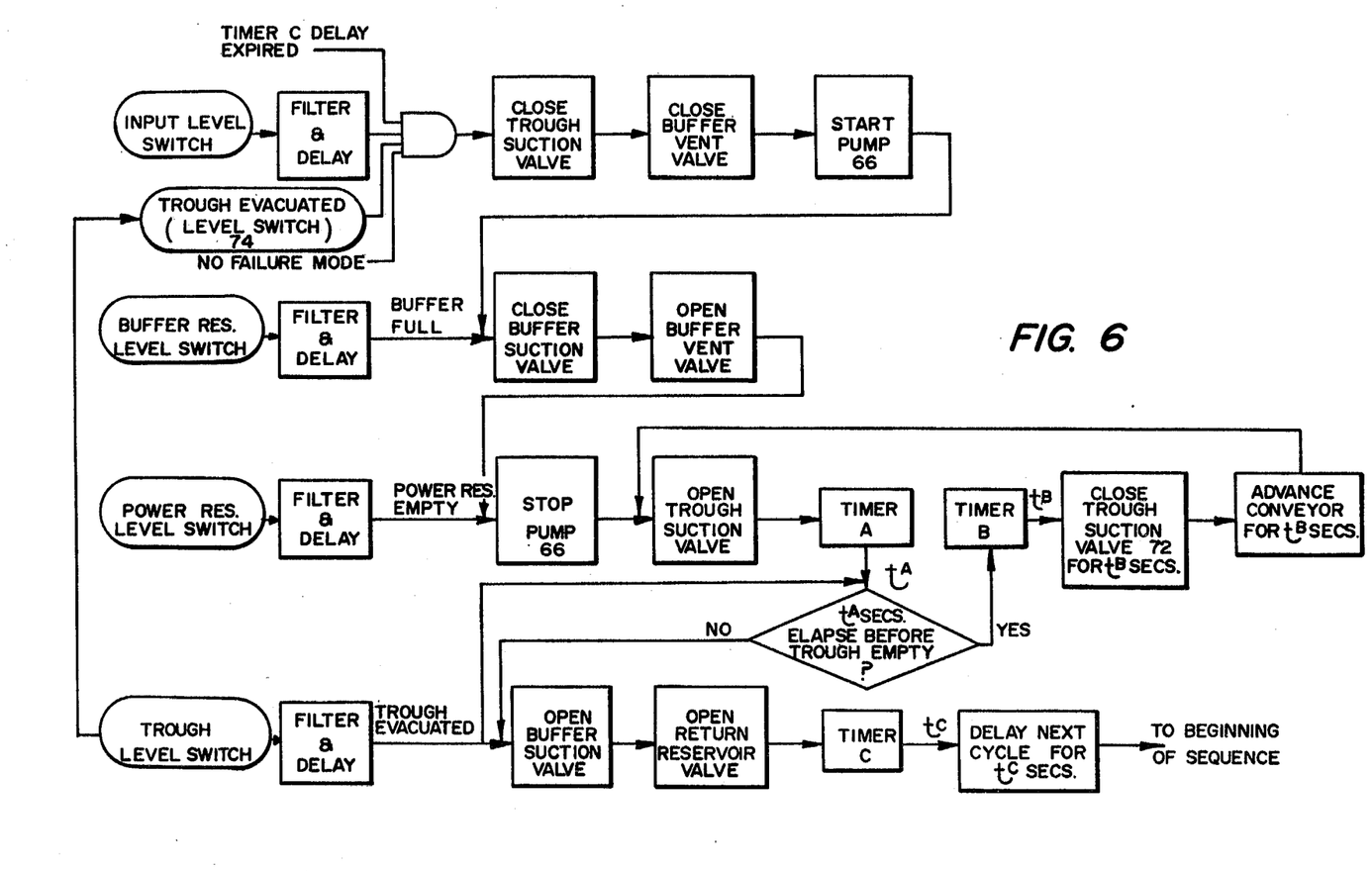
FIG. 6 is a block flow diagram illustrating the logic employed in operating the wastewater filtering and disposal system according to the invention.

Control of the hydraulic/pneumatic suction and wastewater handling system in coordination with control of the trough conveyor system can be accomplished with a digital electronic logic circuit having a flow diagram as shown in FIG. 6. Circuit implementation of this flow diagram will not be detailed, as such implementation is conventional and does not form a part of the invention. However, the electronic level sensing switches 53, 58, 68, and 74 (and an additional sensing switch 100, discussed below) which are specially adapted for the wastewater treating apparatus of the invention, are described in detail below.

The control sequence of FIG. 6 as it applies to the hydraulic/pneumatic system is as described previously. Described herein is the means by which the control circuit coordinates the hydraulic/pneumatic sequence with the advancement of the filter paper into and out of the trough.

The two operations—wastewater delivery, filtration, and handling of filtrate, on the one hand, and filter paper advancement, on the other—are independent. The paper does not advance once per cycle. To make optimum use of the filter paper 12, it is desirable only to replace the paper at such time as clogging by oils, scums and/or solids cause the paper's filtering rate to drop below an acceptable operating level. This filtering rate, in particular, can be measured in terms of the interval between the application of suction to the trough, and the instant at which the liquid level in the trough reaches a particular height.

With respect to FIGS. 5 and 6, the control circuit starts a timer A with a timing interval $t_A$ at such time as the centrifugal pump 66 has exhausted the power reservoir 63 and shut off and the trough valve 72 has opened, thereby applying a stored suction to the trough paper and contained wastewater. If a filtered and delayed signal from the trough liquid level switch 74 reaches the timer A before expiration of the interval $t_A$, indicating that the filtrate is exhausted from the trough within this period, then the hydraulic/pneumatic cycle continues as descirbed above; i.e., the buffer suction valve 71 is opened and the return reservoir valve 64 is opened momentarily, dumping liquid back into and filling the lower reservoir 63. The system is then prepared for a new cycle, but a timer C preferably delays the start of the next cycle for $t_C$ seconds.

However, if the timing interval $t_A$ expires before the filtered and delayed signal from the switch 74 indicates trough exhaustion, the filter is considered clogged. In this case ("yes" on the flow chart), upon expiration of the interval $t_A$, the filter conveyor 11 is activated for $t_B$ seconds to advance fresh paper and discard the spent paper with contents to the composting area. Some unfiltered liquid and solid waste material remains in the trough while the paper advances. During the interval of paper advance, the trough suction valve 72 is simultaneously closed for $t_B$ seconds to preserve the stored suction of the power reservoir 63, as well as to prevent any drag on the conveyor net 27 by the stored suction. Once paper advance is completed, trough suction and filtration is repeated for another $t_A$ seconds, or until the trough is exhausted, whichever occurs first. Trough suction and paper advance cycles will continue to alternate until the remaining material in the trough becomes exhausted within the suction interval $t_A$.

As the flow diagram of FIG. 6 indicates, all liquid level inputs to the control circuit are filtered and delayed before being acted upon. The filtration and delay is useful in removing process noise both from electrical sources coupled in through connecting cabling, and also from wave action within the system tanks. In the case of the input from the immersible trough liquid level switch 74, the filtration and delay serves another function; it allows the level threshold of the switch to be located physically a slight distance above the bottom of the trough and yet delay response to the switch long enough for the liquid to have receded below the level of the paper. Thus, the paper will be sucked virtually dry every cycle.

The remainder of the control logic is in accordance with the above discussion of hydraulic/pneumatic system operation. At the start of a cycle, provided the input level switch 53 detects the presence of wastewater at that location and other conditions discussed below are met, the trough suction and buffer suction valves 72 and 60 are closed and the pump 66 is started. When the buffer reservoir level switch 58 detects a full charge of wastewater, pumping continues but the buffer suction valve, which has been open, is closed, and the buffer vent valve 60 is opened to vent vacuum from the reservoir 55. This allows wastewater in the riser pipe 54 to drop back and helps facilitate the opening of the sewage-dumping flap valve 56. Pumping continues until the power reservoir level switch 68 detects a nearly empty reservoir 63, at which time the pump is stopped. Then the trough suction valve 72 is opened to commence filtration, timer A is actuated, and the cycle continues as discussed previously.

Figure 6A:
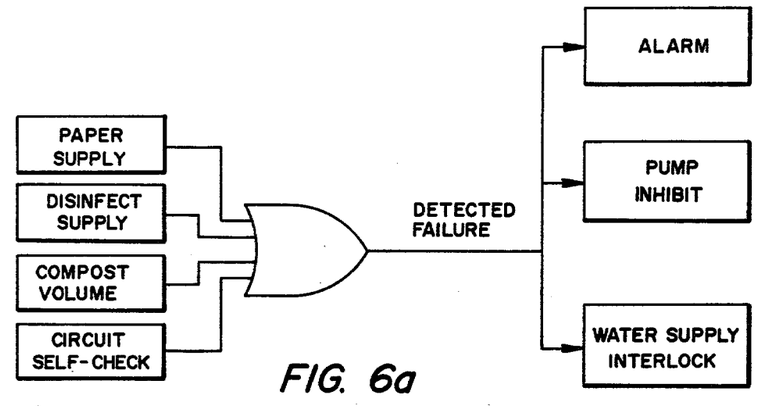
FIG. 6A is a flow diagram associated with the operation illustrated in FIG. 6.

It will be noted from FIG. 6 that a fail-safe feature of the electronic control circuit requires several pre-conditions before the pump can be started, in addition to the expiration of the timer C delay: (1) that no liquid is in the trough (as detected by the level switch 74); (2) that no failure modes have been detected. Failure modes can be monitored by self-checking circuitry, monitoring the sequence of inputs and outputs, and also by external sensor switches. Failure modes can include the following conditions, some of which are illustrated in the partial flow diagram of FIG. 6A:

(1) Inadequate paper supply
(2) Inadequate disinfectant supply
(3) No space left in the composting area
(4) A leak in the buffer flap valve (as might be caused by lodged solids)
(5) Excessive running time of the pump in a particular processing cycle.

In addition to inhibiting pump operation (FIG. 6), the output of the failure detection circuitry can be used to control an alarm and a water supply interlock, the latter being described below.

5. Composting

Compositing alternatives are well understood and those that are best suited for use in conjunction with the paper filtration process of the invention will vary widely depending upon the scale of processing, climate, available space, end uses of compost and other factors. The choice of such alternatives will, however, be limited by restrictions concerning material transfer and human handling posed by the highly contaminated nature of the solids, in the case of domestic sewage or other organic wastes. Two very different methods of composting will be described which illustrate feasible methods of composting involving a minimal amount of material transfer and human handling.

Figure 7:
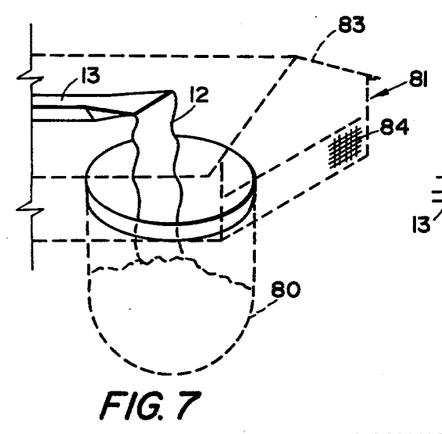
FIG. 7 is a schematic perspective view illustrating one form of solids composting that can be used.
Figure 10:
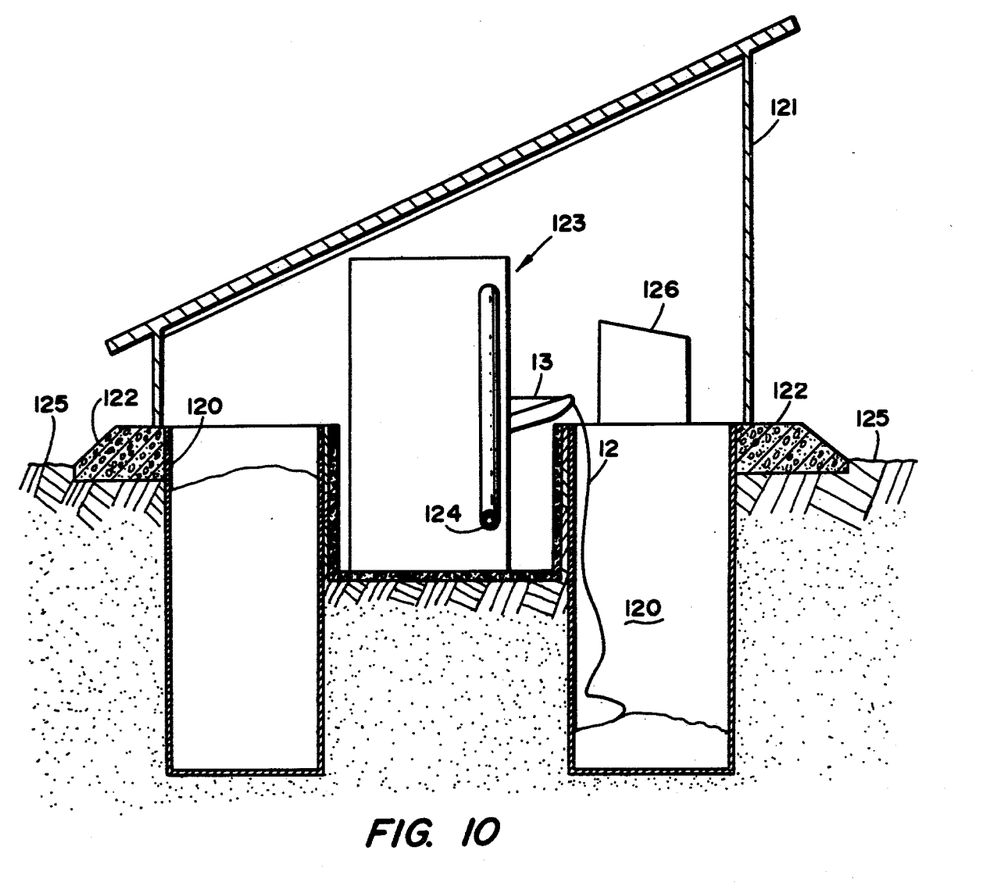
FIG. 10 is a sectional elevation view showing a rural implementation of the wastewater treatment apparatus of the invention.

FIG. 7 schematically illustrates a simple method involving anaerobic composting of sewage solids as would be useful for rural dwellings and in regions having colder climates wherein hot composting is impractical. Shown are the effluent end of the trough 13 directly dumping paper 12 with solids into a lined pit 80, in an enclosure 81 having an overhead roof 83 and insect screen 84. The lining serves to prevent seepage of pathogens into the ground and possible contamination of nearby water supplies. The overhead roof prevents precipitation from entering the pit. The insect screen blocks access to the solids by insects and other disease vectors. Another arrangement for anaerobic composting, in a preferred type installation, is shown in FIG. 10 and discussed below.

Dimensions of the pit are so chosen as to balance, to the extent possible, the evaporation and decomposition rate with the rate of solids input. With a suitable choice of pit size, cleaning or relocation of the pit is not required for many years. The risk of pathogen problems make unadvisable the use of the pit contents obtained this way for fertilizer.

Figure 8:
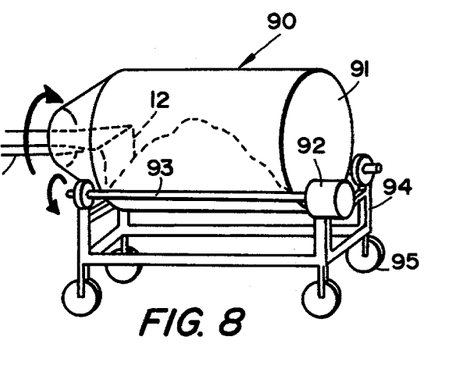
FIG. 8 is a schematic perspective view illustrating another form of solids composting.

FIG. 8 shows a preferred and more mechanized composting apparatus 90 designed to produce a beneficial soil amendment using hot aerobic composting. Such an apparatus is best suited for larger scale processing where solids volumes and economies of scale would make the scheme practical. The fermentation reaction for this composting method can be enhanced by the addition to the sewage solids of supplementary carboniferous matter such as paper, sawdust, dried leaves and kitchen wastes, which allow optimization of the carbon to nitrogen ratio. In this manner, sewage and solid wastes can be beneficially and economically integrated.

Shown in FIG. 8 are the effluent end of the filter trough 13 dumping paper 12 with sewage solids into a tumbling bin 91 rotated by an electric motor 92 transmitting tractive power through a shaft 93 upon which the bin 91 rests, the whole assembly of which is on a transportable frame 94 on wheels 95. The motor 92 receives electrical power from the same switch activating the paper conveyor (see FIGS. 5 and 6); thus the movement of spent paper into the bin is coordinated with rotation of the bin and the possibility of paper misalignment on the conveyor is minimized. The speed of bin rotation is so selected that during the course of a 24-hour period, the incremental movements of the bin will total approximately one rotation.

The bin 91 will be constantly aerated during the entire period that it receives solids. When the bin is finally filled the entire bin and power drive assembly can be wheeled to a storage area where it will continue to be rotated approximately one rotation per day until its contents have been adequately decomposed. As soon as one bin becomes filled it is replaced with an alternate bin assembly, already emptied. With two or three such assemblies serving one trough a continuous aerobic composting operation can be maintained. This enables the solid wastes of the sewage to be converted into a beneficial soil fertilizer with very little odor. The on-site filtration and immediate composting of the solids facilitate the use of this preferred aerobic composting method.

6. Water Supply Interlock Subsystem

Another feature of the invention is a water supply interlock system particularly suited to residential sewage treatment applications. The interlock gives protection against overflow of the input reservoir 51 and attendant health hazards, as might occur during processing overloads, power outages of excessive duration, or unit failures. It accomplishes this by sharply dropping the water supply and pressure to affilitated dwellings during such periods, thereby both limiting the generation of sewage and warning the user of an abnormal condition.

Figure 9:
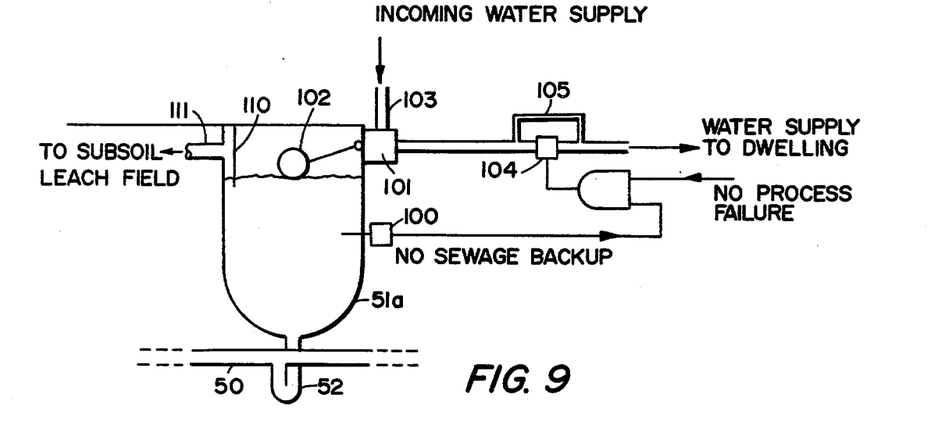
FIG. 9 is a schematic elevational view showing an interlock connection to a household water supply to prevent overflow loading of the wastewater treating system, and also showing alternative apparatus for overflow septic tank operation.

FIG. 9 schematically indicates one embodiment of such a water supply interlock system. Shown are the sewage input pipe 50, a modified input reservoir 51a, a liquid level switch 100 at some intermediate point on the height of the input reservoir, a float valve 101 at the top of the reservoir with a float 102, an incoming dwelling water supply pipe 103, a preferably normally-closed type solenoid operated valve 104 (but which is held open in normal operation of this system, as described below), a pressure-reducing bypass pipe 105, and an output water pipe 106 leading to the dwelling or dwellings. The valve 101 is open when the float 102 is in a lowered position. Process failure information is received from the electronic control circuitry as schematically depicted in the flow diagram of FIG. 6A.

The normally-closed solenoid valve 104 is powered open when indications of both no process failure and no sewage backup are present. Should line power fail, should a process failure occur, or should the sewage buildup in the input reservoir 51 reach the threshold of the liquid level switch 11, then the valve 104 will revert to its unpowered closed state, thereby forcing supply water to be bypassed through the pressure-reducing line 105. Upon resumption of normal conditions, the valve 104 will return to its open state and normal pressure will be restored.

If abnormal conditions persist long enough to allow the input reservoir 51 to fill up even under reduced water pressure, then the float valve 101 will shut off the water supply completely.

7. Default Septic Tank Operation

For those rural and suburban areas where septic tanks have been used, the input reservoir 51a of the paper filtration process can be designed to default as a septic tank when a protracted power outage or other failure occurs. Similarly, for those dwellings converting from septic tank operation to the paper filtration process, the existing septic tank can be retained as an emergency system to limit the input reservoir's function to that of storage surge loads.

Accordingly, FIG. 9 also shows, in connection with the input reservoir 51a, septic modifications which may be made either in addition to or alternatively to the water supply interlock apparatus 100-106, to permit septic tank operation when the reservoir becomes abnormally full. A baffle plate 110 positioned near the top of the reservoir 51a blocks floating scum from exiting through an exit port 111. Effluent from the port 111 is conveyed to a sub-soil leach field (not shown) as would be used for a septic tank. Volume of the reservoir should be comparable to that of a septic tank serving the same installation.

The use of the septic tank modification 110 and 111 is preferably as an alternative to the water supply interlock system described above. However, in the event both systems are included in the reservoir 51a, the septic exit port 111 should be located somewhat below the shutoff level of the float 102 and float valve 101, so that the dwelling's water supply is shut off only if the auxiliary septic tank operation malfunctions or is loaded beyond capacity.

Referring back to FIG. 5, apparatus is shown for incorporating an existing septic tank as an emergency system to supplement the paper filtration process. The input reservoir 51 in this application can be relatively small in volume, somewhat smaller than otherwise necessary, sufficient only to buffer surge input loads during normal operation. This installation does not require relocation of the septic tank, but merely interposes bypass piping to incorporate the paper filtration process. An inverted U-shaped pipe 115 (dashed lines) is the principal component of the hook-up to the existing septic tank, which is not illustrated in FIG. 5. The pipe 115 acts as a hurdle between the input sewage pipe 50 and the septic tank.

Under normal conditions, incoming sewage flows straight into the riser pipe 54 as well as fills up the reservoir trap 52, sometimes rising slightly above the trap 52 in the reservoir 51. If surge loads enter causing a process backlog, the surge input reservoir 51 temporarily retains the excess until it can be processed. Only under such circumstances as the reservoir 51 becomes totally filled would the level of incoming sewage be sufficiently high to overcome the hurdle pipe 115 and enter the septic tank. The movement of overflow sewage toward the septic tank is indicated by an arrow 116 in FIG. 5.

8. Rural Implementation

FIG. 10 shows a preferred rural implementation of the wastewater treatment apparatus of the invention. This implementation for rural toilets is a good example of how anaerobic composting of separated solids and filter paper can advantageously be utilized. Two or more lined composting pits 120 are provided under a roof structure 121 which may be periodically disconnected from its foundation 122 and rotated to a new position. A wastewater processing unit 123 constructed in accordance with the invention rests upon a portion of the foundation with the effluent end of its filtration trough 13 overhanging one of the pits 120. Waste water enters the unit via a conduit 124, and solids and filter paper 12 are incrementally advanced into the pit 120 for anaerobic composting. Filtered and treated water from the unit 123 may be spread over or injected into the surrounding soil 125.

Each of the lined composting pits 120 may be of ten years' capacity. The active pit, on the right in FIG. 10, has positioned over it an emergency toilet 126 for privy operation in the event of a protracted power failure. At the end of each ten-year period, with both pits full, the pit which has been dormant for ten years is emptied, and the processing unit 123, the roof structure 121, and the toilet 126 are turned around so that the emptied pit becomes active. This provides at least a ten-year composting period for all of the solid wastes in each pit.

Although two composting pits 120 are preferably provided under the roof structure 121, there may be four at symmetrically spaced locations if desired, to increase the composting period or to reduce the frequency of emptying the pits.

9. Level Sensor

Figures 11, 12, 13:
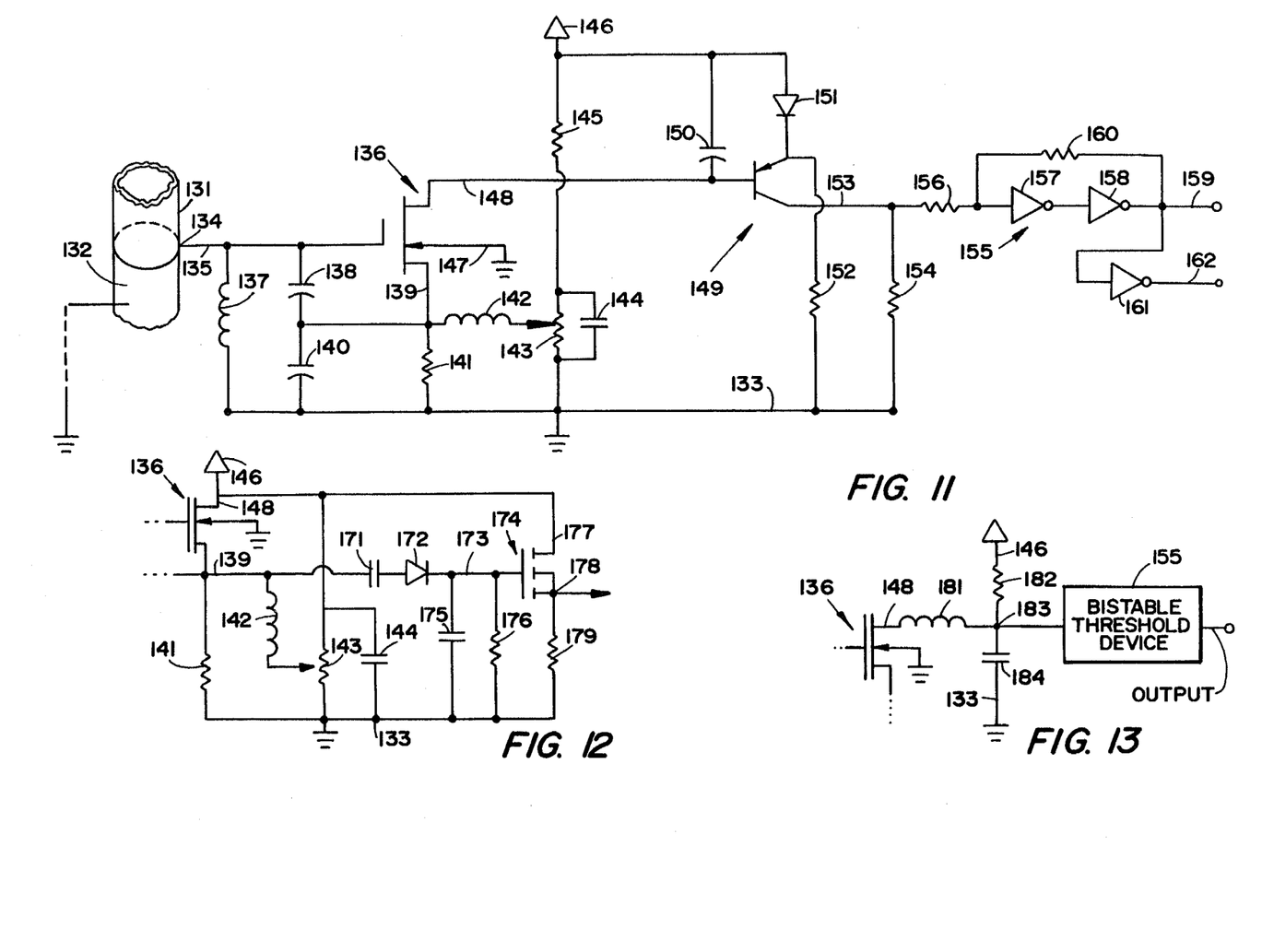
FIG. 11 is a schematic circuit diagram of one of the liquid level sensors included within the apparatus of the invention.
FIG. 12 is a partial schematic circuit diagram of an alternative liquid level sensor circuit.
FIG. 13 is a partial schematic circuit and block diagram of another alternative liquid level sensor circuit.

A liquid level sensor 130 for implementing the level switches 53, 58, 68, 74, and 100 is shown schematically in FIG. 11. The sensor circuit 130 includes a Colpitts oscillator designed to oscillate preferably in the HF to VHF spectrum. In practice, 25 MHz has been found to be a satisfactory frequency. The oscillator feedback and gain are set so that oscillations cease when additional capacity supplied by liquid comes into proximity with a sensor element thereby loading the resonant circuit of the oscillator and reducing its quality factor (Q).

The sensor circuit 130 is preferably located adjacent to a reservoir or vertical conduit or pipe. A section 131 of a vertical three-inch diameter PVC pipe is shown in FIG. 10 as having a liquid 132 therein. The liquid has a relatively low resistance path to ground 133, as shown. An annular wire band 134 surrounds the pipe 131 at a predetermined position corresponding to the liquid level at which detection is to occur.

In the case of metallic reservoirs or pipe, or plastic pipe having thick walls, where an external loop is not practicable, an interiorly placed loop of small wire, insulated with a durable synthetic resin polymer insulating material (DuPont's Teflon works well) may be used in place of the external loop. Such an internal loop is illustrated in FIG. 5, in close connection with the switch 58.

Returning to FIG. 11, a short wire 135 connects the wire loop 134 to a gate of an insulated gate field effect transistor 136. Also connected to the gate wire 135 is an inductor 137 to ground 133 and a capacitor 138 to a source lead 139 of the transistor 136 to provide a feedback path. A second capacitor 140 is connected from the source 139 to ground 133 and completes the resonant circuit of the Colpitts oscillator. A Hartley or other form of oscillator is equally suited to the present purpose, and the selection of the Colpitts configuration is to be in no sense limiting.

The source lead 139 of the transistor 136 further includes a resistor 141 to ground 133 and an RF choke 142 connected to a wiper of a potentiometer 143. The variable resistor 143 is bypassed to ground by a capacitor 144. One side of the potentiometer 143 is grounded and the other side thereof is connected through a series resistor 145 to a positive supply bus 146.

As will be appreciated by those skilled in the art, the potentiometer 143 establishes the bias point of the transistor 136 and thus the gain thereof. The potentiometer 143 is set so that the gain of the transistor 136 is sufficient to enable it to operate just above the threshold of oscillation when no liquid is in proximity of the loop 134. The close proximity of liquid 132 with respect to the loop forms a capacitor therewith which adds capacity and resistance in parallel across the inductor 137 and capacitors 138 and 140 thereby reducing the quality factor of the tank circuit to a point at which oscillations cease.

The transistor 136 includes a substrate lead 147 which is grounded and a drain lead 148 which is connected to the base of a PNP transistor 149 functioning as a buffer and isolator for the oscillator transistor 136. The transistor 149 also provides a load for the drain circuit of the insulated gate transistor 136. A capacitor 150 bypasses and decouples radio frequency energy from the base of the transistor 149 to the positive supply bus 146.

The transistor 149 includes an emitter having a forward biased reference voltage setting diode 151 connected to the positive supply bus 146 and a resistor 152 connected to ground 133. A collector of the transistor 149 provides an output line 153 to which a lead resistor 154 is connected. The resistor 154 is connected to ground.

The output line 153 from the buffer transistor 149 is connected to a bistable threshold device in the form of a Schmitt trigger 155. An input resistor 156, between the line 153 and an input of the inverter 157, provides isolation and impedance matching for the inverter 157. An output from the inverter 157 is connected to an input of a second inverter 158. An output 159 of the second inverter 158 is connected via a feedback resistor 160 to the input of the first inverter 157 to form the Schmitt trigger and establish the threshold level thereof.

The output 159 is also connected to an input of a third inverter 161 having an output 162 which is complementary with the output 159.

The field effect transistor 136, a depletion mode device, is adjusted to operate as a Class C amplifier by adjustment of the wiper of the potentiometer 143 which places a positive potential on the source mode 139. When oscillations occur, current flow from the source 139 to the drum 148 of the transistor 136 increases substantially, with the result that the base current of the PNP buffer transistor 149 is also increased. The increased base current of the transistor 149 produces a corresponding increase in the emitter to collector current thereof. The voltage on the collector lead 153 thereupon approaches the voltage potential of the supply bus 146.

When oscillations cease, the current flow through the transistor 146 and the base of the buffer transistor 149 diminish significantly. The voltage appearing on the collector lead 153 then falls, to approach ground potential, which signals the fact that the transistor 136 has ceased to oscillate.

The voltage transition thus appearing on the collector lead 153 is thereafter shaped into a logical control signal by the operation of the Schmitt trigger 155.

Several alternative means exist for detecting the presence of oscillations. FIG. 12 shows an AC coupled rectifier and low pass filter which convert the oscillations of the transistor 136 into a DC control bias for controlling an alternative bistable threshold device, although the Schmitt trigger 145 could be used with this alternative, too.

In FIG. 12, the drain 148 of the transistor 136 is connected directly to the positive supply bus 146. Output is taken from the source 139 through a blocking capacitor 171 and through a diode rectifier 172 to a gate 173 of a second field effect transistor 174. A low pass network of a capacitor 175 and a resistor 176 is connected from the gate 173 to ground 133. A drain 177 is connected directly to the positive supply bus 146, and a source 178 is connected through an output load resistor 179 to ground. The transistor 174 is preferably an enhancement mode field effect device which will not conduct in the absence of a positive gate bias voltage.

Oscillations of the transistor 136 are passed by the capacitor 171 and are rectified into a pulsating direct current by the diode 172. These pulsations are smoothed by the filtering action of the capacitor 175 and resistor 176. Thus, when oscillations occur, a positive bias voltage appears at the gate 173 of the transistor 174 which thereupon conducts from source 178 to drain 177. A positive voltage then appears at the output which takes from the source 178. When no oscillations occur, the transistor 154 is not biased, does not conduct, and the voltage at the output drops to ground potential.

Another alternative form of oscillation detector circuit is illustrated by the partial schematic diagram of FIG. 13. Therein, the transistor 136 has its drain 148 connected through an RF choke 181 and a load resistor 182 to the positive supply voltage bus 146. A node 183 between the inductor 181 and resistor 182 is bypassed to ground 133 by a bypass capacitor 184. The node 183 is also directly connected to the input of a bistable threshold device, such as the Schmitt trigger 155. When oscillations occur, a DC potential is present across the load resistor 182 which will bias the trigger 155 into a low logic state. However, when oscillations cease, only a miniscule leakage current will flow through the resistor 182, thereby biasing the trigger 145 into a high logic state.

The sensor 130 is thus seen to provide an effective liquid level detector which is not only sensitive to the presence of liquid but also which fails safe; i.e., cessation of oscillations, for any reason, provides a logic signal which is used to close valves and shut down operation in the overall processing system.

To those skilled in the art to which this invention relates, these and many other such changes in construction and widely differing embodiments and applications of the invention will suggest themselves without departing from the spirit and scope of the invention. The disclosures and the description herein are purely illustrative and are not intended to be in any sense limiting.

I claim:

1. A filtration system for household sewage, comprising:
    a fresh water supply pipe for said household operably connected to a source of fresh water and to said household;
    a sewage inlet line from the household;
    filtering means for separating the sewage into liquid wastes and solid wastes;
    means for delivering successive charges of sewage from the inlet line to the filtering means;
    a surge reservoir connected into the sewage inlet line;
    a first level sensor at a first level in the surge reservoir;
    means operably connected to the first level sensor and to said fresh water supply pipe of the household for reducing the flow rate of fresh water through the supply pipe to a lower than normal rate when sewage in the surge reservoir has reached said first level;
    a second level sensor at a second level in the surge reservoir, near its top; and
    normally open valve means connected to the fresh water supply pipe of the household for shutting off the fresh water supply when sewage in the surge reservoir has reached said second level.

2. The filtration system of claim 1 wherein said flow reducing means comprises a bypass loop pipe of smaller diameter than the fresh water supply pipe, connected at both ends into the water supply pipe at spaced locations, and a normally open shutoff valve in the water supply pipe between the spaced locations, operably connected to the first level sensor to close when sewage has reached said first level in the reservoir.

* * * * *